(12) United States Patent
Hsu et al.

(10) Patent No.: US 7,517,187 B2
(45) Date of Patent: Apr. 14, 2009

(54) HIGH-SPEED ROTOR ASSEMBLY FOR AN OVERHUNG CENTRIFUGAL COMPRESSOR

(75) Inventors: Li-Chieh Hsu, Taipei (TW); Chien-Ching Hsueh, Hsinchu (TW); Jia-Ruey Wu, Hsinchu (TW); Hung-Ying Jan, TaiChung (TW)

(73) Assignee: Industrial Technology Research Institute, Hsinchu (TW)

( * ) Notice: Subject to any disclaimer, the term of this patent is extended or adjusted under 35 U.S.C. 154(b) by 886 days.

(21) Appl. No.: 10/938,529

(22) Filed: Sep. 13, 2004

(65) Prior Publication Data
US 2005/0129538 A1    Jun. 16, 2005

(30) Foreign Application Priority Data
Dec. 16, 2003    (TW) .............................. 92135739 A (51) Int. Cl.
*F01D 25/16* (2006.01)
(52) U.S. Cl. ...................... 415/111; 415/229
(58) Field of Classification Search ................. 415/111, 415/112, 113, 109, 174.5, 175, 230, 231, 415/171.1, 229; 417/407

See application file for complete search history.

(56) References Cited

U.S. PATENT DOCUMENTS 5,145,334 A * 9/1992 Gutknecht .................. 417/407
6,478,553 B1 * 11/2002 Panos et al. .................. 417/407

* cited by examiner

*Primary Examiner*—Edward Look
*Assistant Examiner*—Aaron R Eastman
(74) *Attorney, Agent, or Firm*—WPAT. P.C.; Justin King (57) ABSTRACT

The invention provides a high-speed rotor assembly for an overhung centrifugal compressor comprising a housing, a rotor component, an oil film damper and an impeller, which is adapted for connecting to a power output mechanism, wherein the rotor component is arranged inside the housing, and the oil film damper is disposed between the impeller and the rotor component, and the impeller is coupled to the rotor component. The rotor component further comprises a sleeve, a first bearing, a second bearing, a transmission shaft, a plurality of resilient elements and a spacer, wherein an end of the sleeve is connected to one of the circular rib by a screw while another end thereof is handing freely, and a oil film damper is disposed between the sleeve and another circular rib. Moreover, the first bearing and the second bearing are respectively arranged at the two side of the sleeve, and the spacer is arranged between the two bearings with the two end thereof respectively abutted against the inner races of the two bearings. Further, the transmission shaft is disposed passing through the spacer and the two bearings, and the impeller is disposed at the second side of the housing and is coupled to an end of the transmission shaft.

17 Claims, 6 Drawing Sheets

HIGH-SPEED ROTOR ASSEMBLY FOR AN OVERHUNG CENTRIFUGAL COMPRESSOR

FIELD OF THE INVENTION

The present invention relates to a rotor assembly, more particularly to a high-speed rotor assembly for an overhung centrifugal compressor.

BACKGROUND OF THE INVENTION

Except for using a built-in auxiliary power unit to start a jet engine, another alternative is by using an air start unit. While using an air start unit for starting a jet engine, compressed air provided by the air start unit is being fed into the air turbine of the jet engine for driving the air turbine to rotate that brings along the main shaft of the jet engine coupling to the same also to rotate. As the rotation speed of the main shaft reaches a specified threshold, the jet engine can be ignited.

The air start unit is substantially a trailer-mounted power unit capable of providing AC and DC electrical power as well as high volume air for starting aircraft engines. The unit consists of a gas turbine engine, air compressor, AC generator, DC generator or DC rectifier, fuel system, battery, air start hose with coupling, and electrical systems for starting and control functions, whose structure and functions are similar to those of the auxiliary power unit (APU). The amount of airflow that an air start unit can provide is closely related to the gas turbine engine and air compressor arranged therein.

Figure 1:
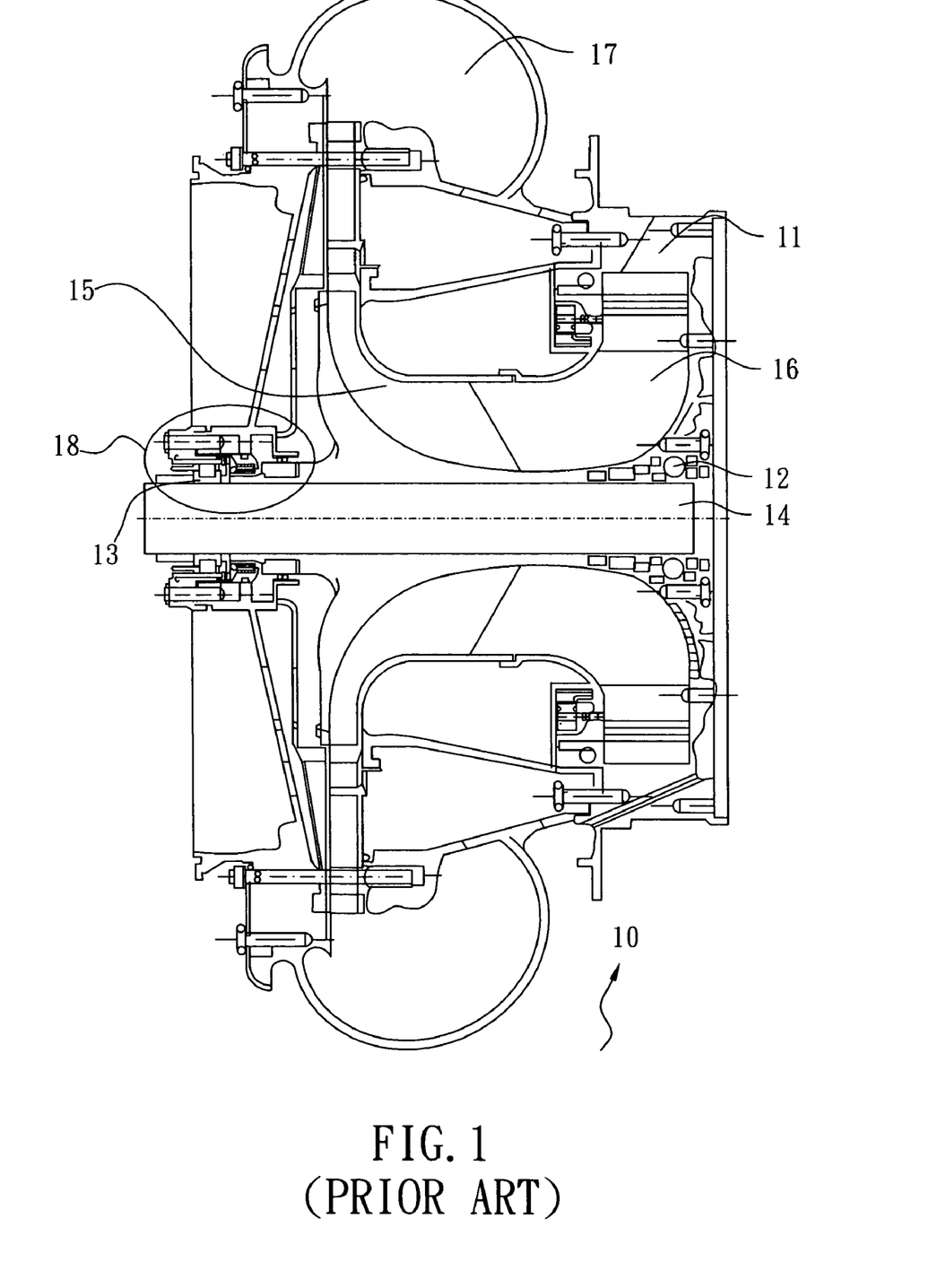
FIG. 1 is a cross-sectional view of the rotor assembly of a conventional compressor.

As seen in FIG. 1, which is a cross-sectional view of a rotor assembly according to a conventional compressor, the rotor assembly 10 comprises a main body 11, two bearings 12, 13, and a transmission shaft 14; wherein the main body 11 has a hole (not shown in the figure) at the center thereof and an impeller 15 disposed surrounding the hole, where the bearings 12, 13 are being arranged in the hole and are disposed respectively at a side of the impeller 15 for enabling the transmission shaft 110 to pass through the bearings 12, 13 and further connect to a power output mechanism (not shown in the figure).

In addition, the rotor assembly 10 further comprises an inlet track 16 and a windpipe 17, both being circumferentially disposed about the hole, wherein the impeller 15 is disposed in the inlet track 16 and the volume thereof occupies the second half of the inlet track 16. Yet, the bearings 12 is substantially a ball bearing and the bearing 13 is substantially a roller bearing capable of rolling axially, and a mechanical oil seal 18 is disposed at the periphery of the two bearings 12, 13 to prevent the lubricating oil from spilling out. Therefore, when the transmission shaft 14 is driven to rotate by coupling the same to a shaft of a power output mechanism, the impeller 15 is rotating that the air sucked in from the inlet track 16 is pressure-boosted by the impeller 15, and thereafter, the compressed air is discharged from the windpipe 17.

However, the rotor assembly of the conventional compressor is still suffer from the following drawbacks:

1. The impeller is disposed between the ball bearing and the roller bearing. Therefore, when the impeller is rotating, the lubricating oil of the bearings may spill out and mix with the compressed air that not only can have an adverse effect on the airplane engine, but also will contaminate the air in the air-conditioned passenger cabin and is harmful to the health of passengers.
2. The conventional compressor attempts to solve the mechanical vibration problem of transmission shaft by using journal bearings. However, it requires an independent oil control system for controlling oil flow and pressure accurately that will increase the manufacturing cost of the compressor.
3. The specification of the roller bearing used in a conventional compressor restricts the rotation speed of the conventional compressor, which can not meet the direct driven speed, i.e. 28000~33000 rpm, by gas turbine.

SUMMARY OF THE INVENTION

The primary object of the present invention is to provide a high-speed rotor assembly for an overhung centrifugal compressor for supplying sufficient compressed air supply required to start an airplane engine and supply air for the air conditioning in the passenger cabin.

Another object of the present invention is to provide a high-speed rotor assembly for an overhung centrifugal compressor capable of effectively overcoming the vibration produced by the high-speed rotation (33000 rpm) of the transmission shaft, and avoiding the critical rotation speed of the transmission shaft from falling into the range of 28000~33000 rpm.

Yet another object of the present invention is to provide a high-speed rotor assembly for an overhung centrifugal compressor having impeller that is easy to install.

Yet another object of the present invention is to a high-speed rotor assembly for an overhung centrifugal compressor conforming to the requirement of high horse power transmission (909 shp) and high torque (144.77 ft-lb).

To achieve the foregoing objectives, the invention provides a high-speed rotor assembly for an overhung centrifugal compressor comprising a housing, a rotor component, an oil film damper and an impeller, which is adapted for connecting to a power output mechanism, such as a turboshaft engine. The housing consisting of a first side, a second side, and having a first circular rib, a second circular rib and a third circular rib arranged therein, where the power output mechanism is disposed at the first side. The rotor component comprises a sleeve, a first bearing, a second bearing, a transmission shaft, a plurality of resilient elements and a spacer, wherein an end of the sleeve is connected to the first circular rib by a screw while another end thereof is handing freely, and the sleeve at the impeller end is slotted by a finger design, in addition, a oil film damper is disposed between the sleeve and the second circular rib which is substantially a oil film formed by pressurizing lubrication oil to be constrained with o-rings. Moreover, the first bearing and the second bearing are respectively arranged at the two side of the sleeve, and the spacer is arranged between the two bearings with the two end thereof respectively abutted against the inner races of the two bearings. The plurality of resilient elements are respectively arranged inside a plurality of bearing studs of the sleeve's inner races. The resilient element, such as coil spring, is designed to provide a specified preload for the bearings. Further, the transmission shaft is disposed passing through the spacer and the two bearing, and the impeller is disposed at the second side of the housing and is coupled to an end of the transmission shaft.

In a preferred embodiment of the present invention, a plurality of pin is arranged inside the corresponding resilient elements that each pin is shorter than the corresponding resilient element for ensuring the linearity of the resilient element. Moreover, each of the bearing stud has a plurality of through holes for receiving resilient elements, that the amount of through holes is correspondence to that of the resilient elements In this embodiment, the rotor assembly further comprises a first slinger, a second slinger and a third slinger, each being mounted on the transmission shaft, wherein the first oil slinger is disposed between and abutted against the circular protrusion of the transmission shaft and the first bearing, and the second and third oil slingers are disposed adjacent to each other, and the second oil slinger is disposed adjacent to the second bearing, and the third oil slinger is disposed adjacent to the impeller.

In this embodiment, the rotor assembly further comprises a plurality of oil seals. The plurality of oil seals includes a first oil seal and a second oil seal, which are substantially labyrinth seals, wherein the first oil seal is disposed on the outer race of the second oil slinger and is coupled to the third circular rib; and the second oil seal is disposed on the outer race of the third oil slinger and is coupled to the fourth circular rib.

In this embodiment, the rotor assembly further comprises a plurality of slinging troughs, a plurality of channels, and an oil sump. The plurality of slinging troughs include a first slinging trough and a second slinging trough, wherein the first slinging trough is substantially the circular space enclosed by the housing, the first oil seal, the second oil slinger, the second bearing and the sleeve, and the second slinging trough is substantially the circular space enclosed by the housing, the second oil seal, the third oil slinger, and the first oil seal, and the oil sump is substantially the circular space enclosed by the housing and the sleeve. The channels are circular disposed with 100°-140° angularly apart. In addition, a plurality of via holes are arranged at the housing such that tubes can penetrate the housing and passing through the sleeve to the neighborhood of the bearings for providing lubricating oil to the same. The labyrinth seals can assure that oil does not enter the compressed air path.

In this embodiment, the rotor assembly further comprises an air seal, being disposed on a circular protrusion at the surface of the back panel of the impeller, which is coupled to the second side of the housing. In addition, the portion of the housing between the air seal and the transmission shaft has a plurality of air duct are arranged thereon, such that the compressed air can be discharged therethrough while the air seal is ineffective.

Moreover, a polygon protrusion is arranged at the center of the impeller's back panel, which is in correspondence to a polygon concave at an end of the transmission shaft proximate to the back panel. When the impeller is connected to the transmission shaft, the polygon protrusion is engaged tightly with the polygon concave. The outer race of the transmission shaft proximate to the power output mechanism can be keyed for coupling to a coupler.

The present invention adopts a high-speed rotor assembly for an overhung centrifugal compressor with the impeller to be arranged at a side of two bearings, not only making the assembling much easier, but also capable of lowering the critical rotation speed and vibration of the transmission shaft by using finger sleeve and oil film damper, so that the high-speed rotor assembly for an overhung centrifugal compressor of the invention can meet with the requirements for supplying sufficient compressed air supply to start an airplane engine and to supply air for the air conditioning in the passenger cabin.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figures 2A, 2C:
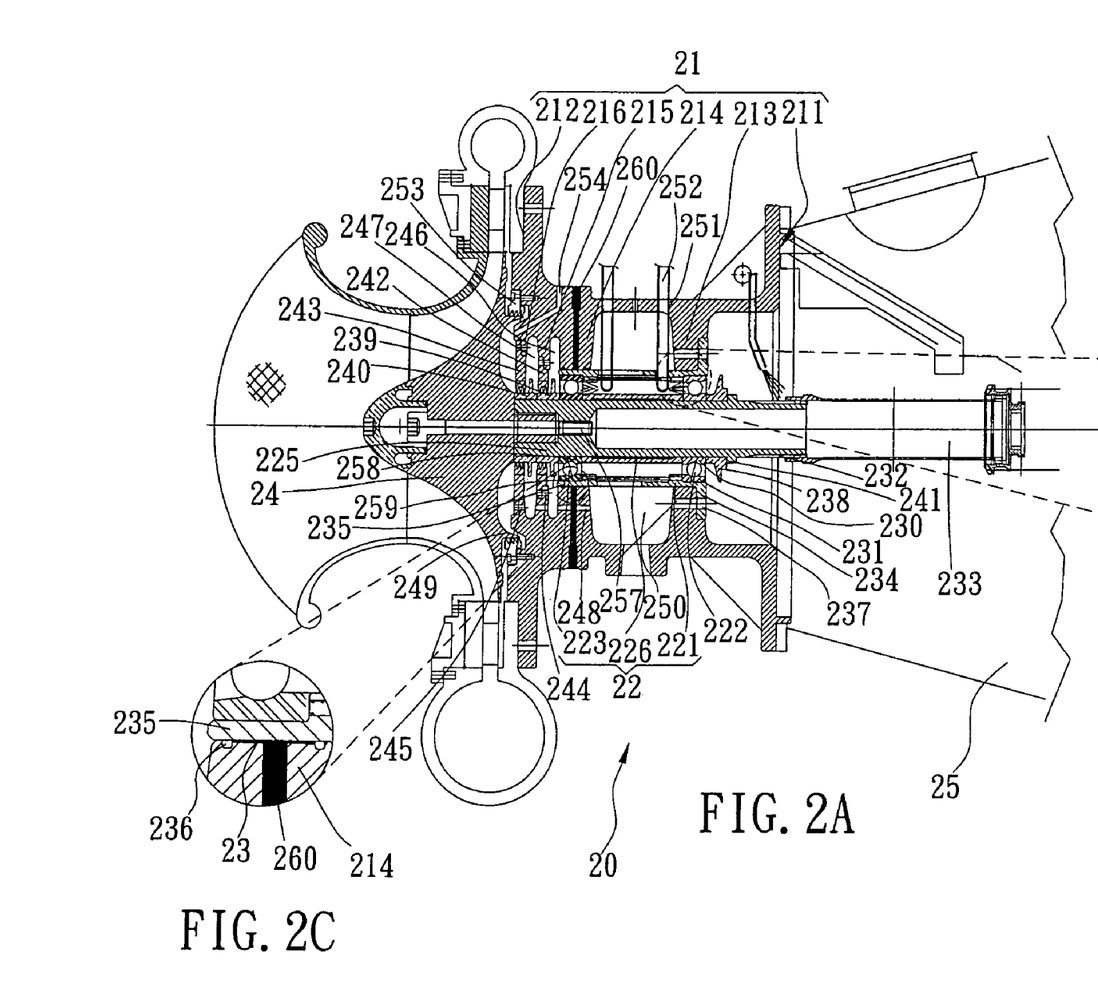
FIG. 2A is a cross-sectional view of the high-speed rotor assembly for an overhung centrifugal compressor according to a preferred embodiment of the present invention.
FIG. 2C is an enlarged view of the oil film damper of the high-speed rotor assembly for an overhung centrifugal compressor according to a preferred embodiment of the present invention.
Figure 2B:
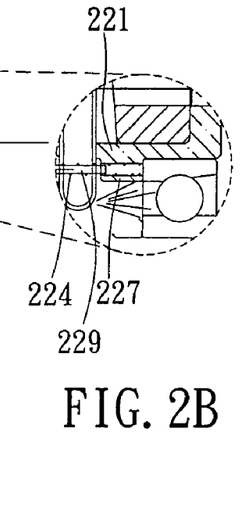
FIG. 2B is an enlarged view of the resilient element and the bearing stud of the high-speed rotor assembly for an overhung centrifugal compressor according to a preferred embodiment of the present invention.
Figure 3:
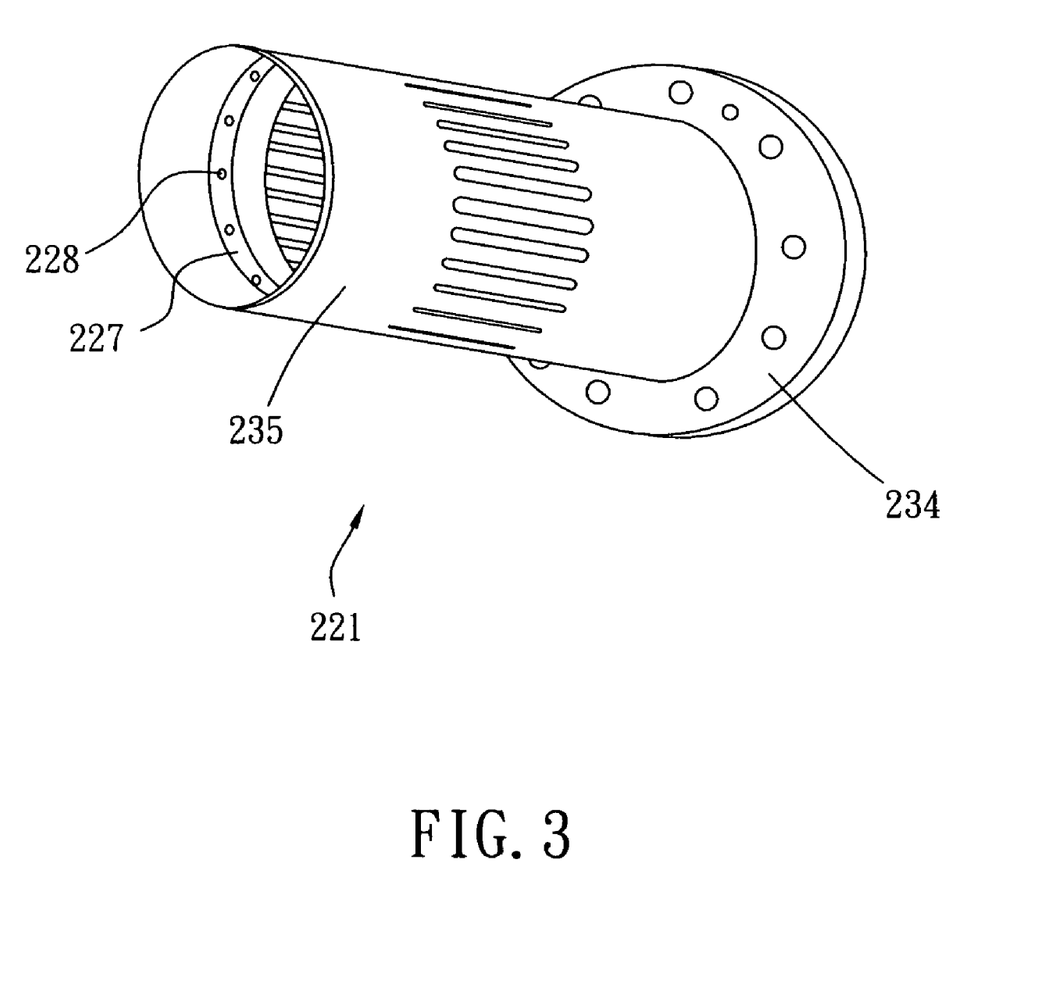
FIG. 3 is a schematic diagram showing a sleeve of the high-speed rotor assembly for an overhung centrifugal compressor according to a preferred embodiment of the present invention.
Figure 4:
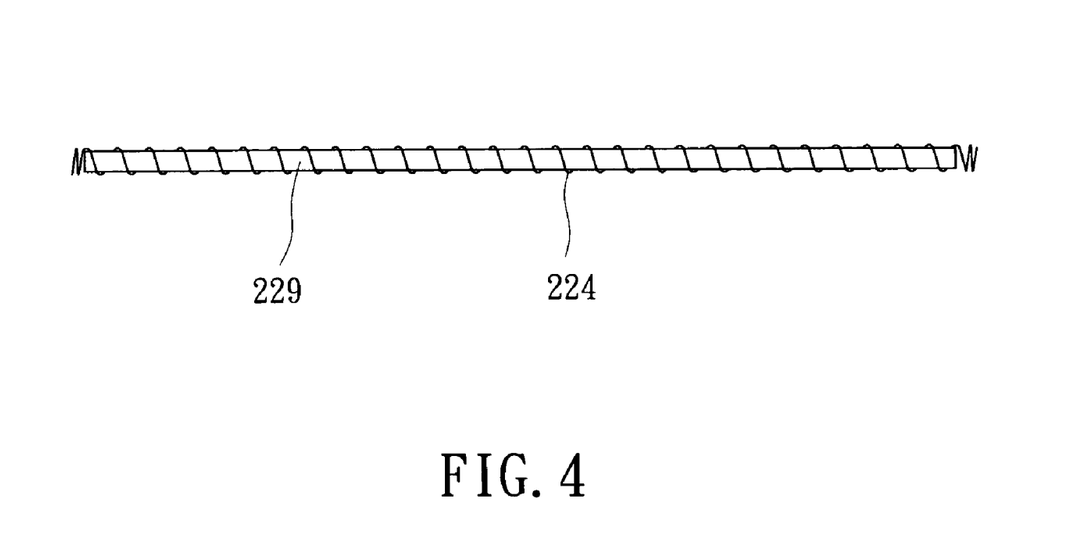
FIG. 4 is a schematic diagram showing an assembly of resilient element and pin of the high-speed rotor assembly for an overhung centrifugal compressor according to a preferred embodiment of the present invention.

With reference to FIG. 2A, which is a cross-sectional view of the high-speed rotor assembly for an overhung centrifugal compressor according to a preferred embodiment of the present invention. The high-speed rotor assembly for an overhung centrifugal compressor 20 comprises a housing 21, a rotor component 22, an oil film damper 23 and an impeller 24, which is adapted for connecting to a power output mechanism 25, such as a turbo jet engine, wherein the rotor component 22 is arranged inside the housing 21, and the oil film damper 23 is arranged between the housing 21 and the rotor component 22, and the impeller 24 is coupled to the rotor component 22.

As seen in FIGS. 2A, 2B, 3 and 4, the housing 21 comprises a first side 211, a second side 212, and has a plurality of circular ribs arranged therein, which is substantially a first circular rib 213, a second circular rib 214, a third circular rib 215, and a fourth circular rib 216 successively. The rotor component 22 comprises a sleeve 221, a first bearing 222, a second bearing 223, a plurality of resilient elements 224, a transmission shaft 225 and a spacer 226, wherein two bearing studs 227 are disposed inside the sleeve 221 by a specified distance apart, and each bearing stud 227 has twelve through holes correspondently for receiving the resilient elements 224. The plurality of resilient elements 224 can be substantially coil springs. In order to ensure the linearity of the resilient element 224, each resilient element 224 has a pin 229 arranged therein, where the pin 229 is shorter than the resilient element 224, but is long enough to mount the two bearing studs 227.

As seen in FIG. 2A, the first bearing 222 and the second bearing 223 are respectively arranged at the two side of the sleeve 221, and a spacer 226 is arranged between the two bearings 222, 223 with the two end of the spacer 226 respectively abutted against the inner races 230, 258 of the two bearings 222, 223, such that the resilient element 224, such as coil spring, can provide a specified preload for the bearings by pressing on the outer races 231, 259 of the two bearings 222, 223. Further, the hollow transmission shaft 225 with keyed outer race is used and is coupled to a coupler 233 enabling the power output mechanism 25 to be positioned at the first side 211 of the housing 21. After the rotor component 22 is assembled, the lugged first end 234 is connected to the first circular rib 213 by a screw 237. It is noted that another end 235 of the sleeve 221 is hanging freely.

Please refer to FIG. 2C, which is an enlarged view of the oil film damper of the high-speed rotor assembly for an overhung centrifugal compressor according to a preferred embodiment of the present invention. The oil film damper 23 is arranged at a minute gap (approximately 0.2 mm) located between the second end 235 of the sleeve 221 and the second circular rib 214, which is substantially a oil film formed by pressurizing lubrication oil from the oil groove 260 to be constrained with two o-rings 236. Since the first end 234 of the sleeve 221 is fixed on the first circular rib 213 by a screw 237 and the second end 235 of the sleeve 221 is hanging freely in the oil film, the transmission shaft 235 is centered automatically while it is rotating in high speed. Moreover, the oil film is formed with sufficient pressure and oil flow that it can support partial weight of the impeller 24 and provide damping action for absorbing the vibration caused by the rotation of the transmission shaft 225. In the preferred embodiment, the sleeve 221 has finger 270 design for providing the necessary stiffness to the second bearing 223 closest to the impeller 24 that, with the help of the effect of oil film damper 23, the overall stiffness is reduced. In this regard, the natural vibration frequency of the transmission shaft 225 is differed from the operating frequency of the transmission shaft 225 while it is operating in 33000 rpm so that resonance can be avoided.

In view of the above description, it is noted that while the transmission shaft 225 is rotating in high speed, the impeller 24 is moved axially forward by pneumatic force that drags the transmission shaft 225 along with the inner races 230, 258 of the first and the second bearings 222, 223 forward as well and consequently, exerts a clockwise torque on the body of the bearings 222, 223 and causes the contact angle of the bearings to change. In order to ensure the bearing to have contact angle conforming to design requirement, twelve resilience elements 224 is installed at the positions between the two bearings 222, 223 for providing a specified preload, i.e. about 100 lbf. Therefore, as the transmission shaft 225 is bringing forward, the outer race 231 of the first bearing 222 will exerts a counterclockwise torque on the body of the bearing 222 by the support of the bearing stud 227 for counterbalancing the clockwise torque exerted by the inner race 230 so that the original contact angle can be maintained, and simultaneously, a counterclockwise torque is exerted on the body of the bearing 223 by the outer race thereof 259 by the action of the preload generated by the resilient element 224 so that the original contact angle is also maintained. On the other hand, as the power output mechanism 25 is shut off or powered down, a backwardly axial movement will occur on the impeller 24 and the transmission shaft 225, and consequently, a counterclockwise torque is exerted on the bodies of the bearings 222, 223, the outer race 259 of the first bearing 223 will exerts a clockwise torque on the body of the bearing 223 by the support of the bearing stud 227 so that the original contact angle can be maintained, and simultaneously, a clockwise torque is exerted on the body of the bearing 222 by the outer race thereof 231 by the action of the preload generated by the resilient element 224 for counterbalancing the counterclockwise torque exerted by the inner race 230 so that the original contact angle is also maintained.

Please refer to FIG. 2, the rotor assembly 20 of the preferred embodiment further comprises a first slinger 238, a second slinger 239 and a third slinger 240, each being mounted on the transmission shaft 225, wherein the first oil slinger 238 is disposed at a position proximate to the power output mechanism 25 by having an end thereof adjacent to the circular protrusion 241 of the transmission shaft 225 and another end thereof abutted against the inner race 230 of the first bearing 222, and the second and third oil slingers are disposed adjacent to each other by mounting on the transmission shaft 225 at a position between the second bearing 223 and the impeller 24, and the second oil slinger 239 is disposed adjacent to the inner race 258 of the second bearing 223, and the third oil slinger 240 is disposed adjacent to the impeller 24. In this embodiment, the rotor assembly 20 further comprises a plurality of oil seals. The plurality of oil seals includes a first oil seal 242 and a second oil seal 243, which are substantially labyrinth seals, wherein the first oil seal 242 is disposed on the outer race of the second oil slinger 239 and is coupled to the third circular rib 215 of the housing 21 by a screw 244; and the second oil seal 243 is disposed on the outer race of the third oil slinger 240 and is coupled to the fourth circular rib 216 by a screw 245.

In this embodiment, the rotor assembly 20 further comprises a plurality of slinging troughs, a plurality of channels, and an oil sump. The plurality of slinging troughs include a first slinging trough 246 and a second slinging trough 247, wherein the first slinging trough 246 is substantially the circular space enclosed by the housing 21, the first oil seal 242, the second oil slinger 239, the second bearing 223 and the sleeve 235, and the second slinging trough 247 is substantially the circular space enclosed by the housing 21, the second oil seal 243, the third oil slinger 240, and the first oil seal 242, and the oil sump 250 is substantially the circular space enclosed by the housing 21 and the sleeve 21, in addition, the first slinging trough 246 and the second slinging trough 247 are connected to a oil sump by three channels 248 which are circular disposed with 100°-140° angularly apart. In addition, as seen in FIG. 2A, a plurality of via holes 251 are arranged at the housing 21 such that tubes 252 can penetrate the housing 21 and passing through the sleeve 221 to the neighborhood of the bearings 222, 223 for providing lubricating oil to the same. The oil lubricating the first bearing 222 is jettisoned to the circular space between the housing 21 and the power output mechanism 25, and the oil lubricating the second bearing 223 is jettisoned to the first slinging trough 246 and the second slinging trough 247 respectively by the second oil slinger 239 and the third oil slinger 240, and the oil slung by the oil slingers is fed back to the oil sump 250 through the three channels 248. Hence, a non-liner and destructive vibration of the rotor assembly 20 caused by oil whip can be avoided.

As seen in FIG. 2A, a circular air seal 253 is being disposed on a circular protrusion 249 at the surface of the back panel of the impeller 24, which is coupled to the second side 212 of the housing 21. The air seal 253 can prevent the air from flowing to the back of the impeller 24 and generating back pressure of about 2000 lbf. The generation of back pressure will force the impeller 24 to move forward that causes the rubbing of the impeller's blades or some more serious damages. In addition, three emergency air ducts 254 are arranged at the position between the air seal 253 and the transmission shaft 225 for discharging the compressed air therethrough while the air seal is ineffective.

Figure 5:
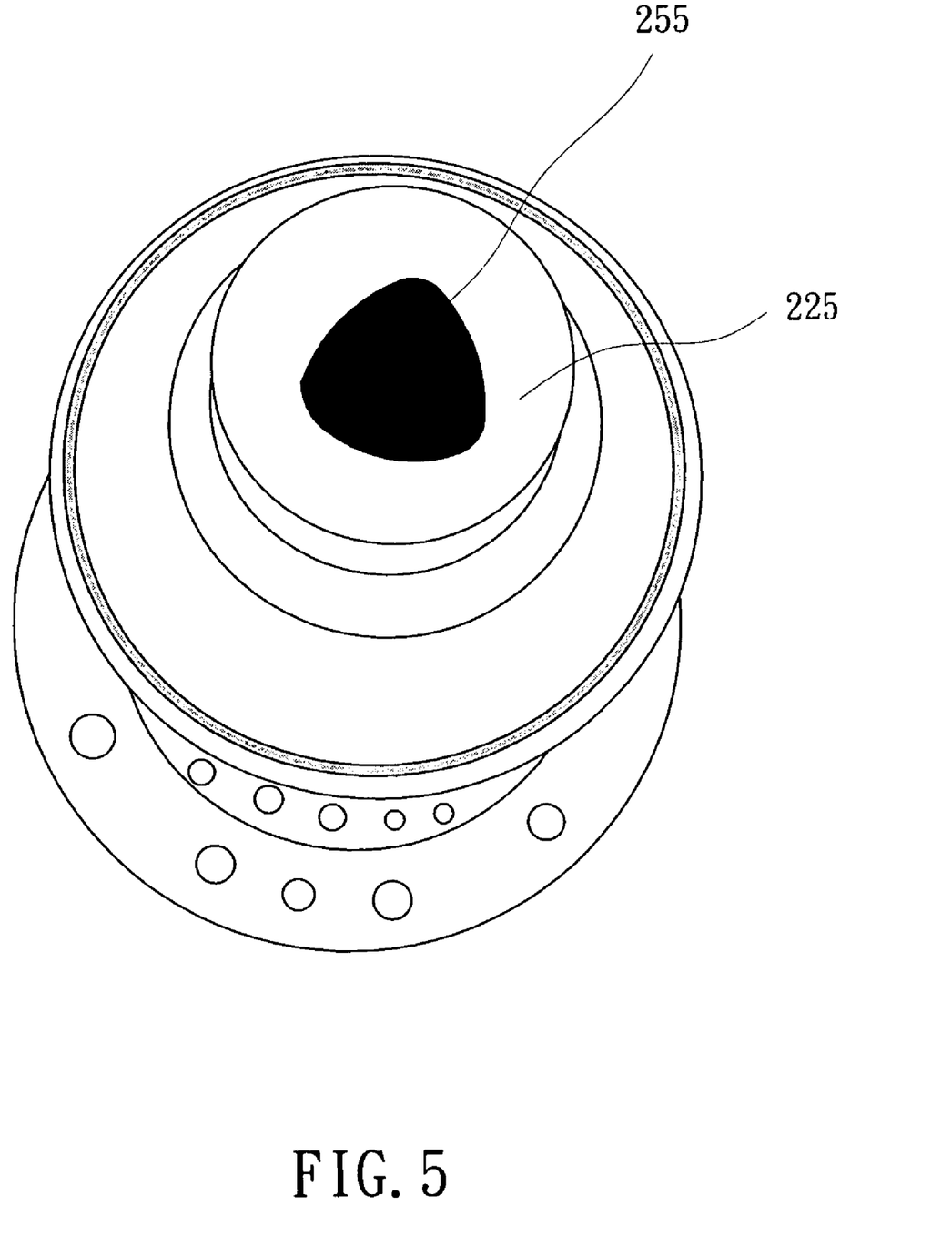
FIG. 5 is a schematic diagram showing a polygon concave of the transmission shaft of the high-speed rotor assembly for an overhung centrifugal compressor according to a preferred embodiment of the present invention.
Figure 6:
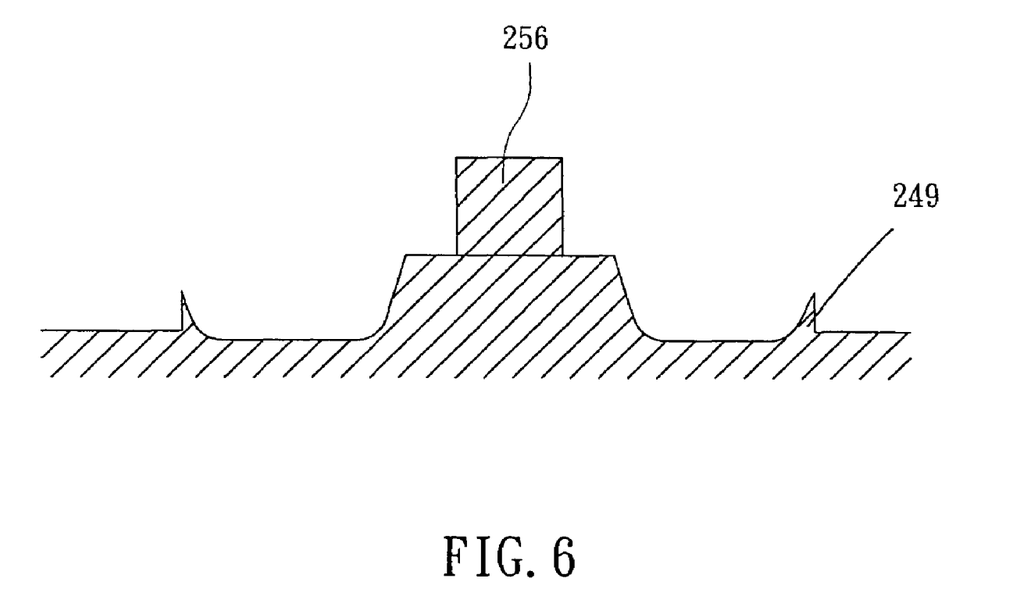
FIG. 6 is a schematic diagram showing a polygon protrusion of the high-speed rotor assembly for an overhung centrifugal compressor according to a preferred embodiment of the present invention.

As seen in FIGS. 2A, 5 and 6, for enabling the impeller 24 to be dismantle from the transmission shaft 225 with ease, a polygon concave 255 is formed at the center of the transmission shaft 225 and a polygon protrusion 256 is formed at the center of the back panel of the impeller 24, where the position of the polygon concave 255 is correspondent to that of the polygon protrusion 256. The impeller 24 can be keyed to the transmission shaft 225 simply by aligning the polygon concave 255 with the polygon protrusion 256 and then rotate the impeller 24 by about 10 degree to be coerced by a torque of approximately 70 lbf exerting with a screw bolt 257. Hence, the impeller 24 is fixed to the transmission shaft 225 axially and is tightly coupled to the transmission shaft 225 while it is rotating in high speed.

In the foregoing preferred embodiment, the impeller is disposed on one side of the two bearings, but the foregoing embodiment is only an example taken for the description and not for limiting the type of impellers, oil film dampers and sleeves and its installation position. Persons skilled in the art should be able to determine the position for installing the impeller of the impeller. Similarly, the bearing of this embodiment could be other bearing structures.

To sum up, the high-speed cantilever centrifugal compressor rotor assembly of the invention at least has the following advantages:
1. In the high-speed rotor assembly for an overhung centrifugal compressor of the present invention, the impeller is hung outside the two bearings and adopts two oil seals and an air seal to fully preclude the lubricating oil from contaminating the air track.
2. The high-speed rotor assembly for an overhung centrifugal compressor of the present invention can supply sufficient compressed air supply required to start an airplane engine and supply air for the air conditioning in the passenger cabin.
3. In the high-speed rotor assembly for an overhung centrifugal compressor of the present invention, the oil film damper and sleeve are adopted and used together to reduce the stiffness of the transmission shaft so as to lower the critical rotation speed to about 12000 rpm and avoid the operating rotation range (28000~33000 rpm) of the transmission shaft.
4. In the high-speed rotor assembly for an overhung centrifugal compressor of the present invention, the impeller is hung outside the two bearing and makes the installation and removal of the impeller easy.
5. The high-speed rotor assembly for an overhung centrifugal compressor of the present invention conforms to the requirement of high horse power transmission of 909 shp and high torque of 144.77 ft-lb.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A high-speed rotor assembly for an overhung centrifugal compressor, coupled to a power output mechanism, comprising:
   a housing, consisting of a first side, a second side, and having a plurality of circular ribs arranged therein, wherein the power output mechanism is disposed at the first side;
   a rotor component, arranged inside the housing, and further comprising: a sleeve, a first bearing, a second bearing, a transmission shaft, a plurality of resilient elements and a spacer, wherein an end of the sleeve is connected to one of the plurality circular ribs while another end thereof is hanging freely, and the first bearing and the second bearing are arranged inside the sleeve with the spacer disposed in-between abutting against the inner races of both the first bearing and the second bearing, and the plurality of resilient elements are arranged inside a plurality of bearing studs of the sleeve's inner races for exerting a specified preload on the outer races of the first and the second bearings, and, the transmission shaft is disposed passing through the spacer and the two bearings;
   an oil film damper, arranged at a position between an end of a sleeve of the rotor component and one of the circular rib; and
   an impeller, being disposed at the second side of the housing to be coupled to an end of a transmission shaft of the rotor component.

2. The high-speed rotor assembly for an overhung centrifugal compressor of claim 1, the rotor component further comprising a plurality of pins, arranged inside the corresponding resilient elements, wherein each pin is shorter than the corresponding resilient element.

3. The high-speed rotor assembly for an overhung centrifugal compressor of claim 1, the rotor component further comprising: a first slinger, a second slinger and a third slinger, each being mounted on the transmission shaft, wherein the first oil slinger is disposed at a position proximate to the power output mechanism by having an end thereof disposed adjacent to a circular protrusion of the transmission shaft and another end thereof abutted against the inner race of the first bearing, and the second and third oil slingers are disposed adjacent to each other at a position proximate to the impeller, and the second oil slinger is disposed adjacent to the second bearing, and the third oil slinger is disposed adjacent to the impeller.

4. The high-speed rotor assembly for an overhung centrifugal compressor of claim 1, wherein the plurality of circular ribs includes: a first circular rib, a second circular rib, a third circular rib, and a fourth circular rib in succession, and the first circular rib is fixed to an end of the sleeve by a screw.

5. The high-speed rotor assembly for an overhung centrifugal compressor of claim 4, wherein the oil film damper is disposed between an end of the sleeve and the second circular rib, and is substantially an oil film formed by pressurizing lubrication oil to be constrained with a plurality of o-rings.

6. The high-speed rotor assembly for an overhung centrifugal compressor of claim 4, further comprising: a first oil seal and a second oil seal, wherein the first oil seal is disposed on the outer race of the second oil slinger and is coupled to the third circular rib, and the second oil seal is disposed on the outer race of the third oil slinger and is coupled to the fourth circular rib.

7. The high-speed rotor assembly for an overhung centrifugal compressor of claim 6, further comprising: a first slinging trough, a second slinging trough, a plurality of channels, and an oil sump, wherein the first slinging trough is substantially the circular space enclosed by the housing, the first oil seal, the second oil slinger, the second bearing and the sleeve, and the second slinging trough is substantially the circular space enclosed by the housing, the second oil seal, the third oil slinger, and the first oil seal, and the oil sump is substantially the circular space enclosed by the housing and the sleeve, and the plurality of channels are circular distributed connecting the plurality of slinging troughs and the oil sump.

8. The high-speed rotor assembly for an overhung centrifugal compressor of claim 7, wherein the channels are circularly disposed with 100°-140° angularly apart.

9. The high-speed rotor assembly for an overhung centrifugal compressor of claim 1, wherein a polygon concave is formed at the center of the transmission shaft proximate to the impeller for coupling to the impeller.

10. The high-speed rotor assembly for an overhung centrifugal compressor of claim 9, wherein a polygon protrusion is formed at the center of a back panel of the impeller, and the position of the polygon concave corresponds to that of the polygon protrusion for enabling the polygon concave to be able to receive the polygon protrusion and thereafter to be coerced by a screw bolt.

11. The high-speed rotor assembly for an overhung centrifugal compressor of claim 1, wherein both the first bearing and the second bearing are ball bearings.

12. The high-speed rotor assembly for an overhung centrifugal compressor of claim 1, wherein the sleeve is hollowed with a plurality of fingers opened thereon.

13. The high-speed rotor assembly for an overhung centrifugal compressor of claim 1, wherein the plurality of bearing studs are disposed adjacent to the first bearing and the second bearing, each having a plurality of holes for receiving the resilient elements.

14. The high-speed rotor assembly for an overhung centrifugal compressor of claim 1, wherein a plurality of holes are arranged at the housing enabling a plurality of tubes to penetrate the housing and pass through the sleeve to the neighborhood of the first bearing and the second bearing for providing lubricating oil to the same.

15. A high-speed rotor assembly for an overhung centrifugal compressor, coupled to a power output mechanism, comprising:
    a housing, consisting of a first side, a second side, and having a plurality of circular ribs arranged therein, wherein the power output mechanism is disposed at the first side;
    a rotor component, arranged inside the housing;
    an oil film damper, arranged at a position between an end of a sleeve of the rotor component and one of the circular rib;
    an impeller, being disposed at the second side of the housing to be coupled to an end of a transmission shaft of the rotor component; and
    a circular air seal, being disposed on a circular protrusion at the surface of a back panel of the impeller to be coupled to the second side of the housing;
    wherein a plurality of air ducts are arranged on the housing at the position between the air seal and the transmission shaft, for discharging the compressed air of the back panel of the impeller therethrough while the air seal is ineffective.

16. A high-speed rotor assembly for an overhung centrifugal compressor, coupled to a power output mechanism, comprising:
    a housing, consisting of a first side, a second side, and having a plurality of circular ribs arranged therein, wherein the power output mechanism is disposed at the first side;
    a rotor component, arranged inside the housing;
    an oil film damper, arranged at a position between an end of a sleeve of the rotor component and one of the circular rib; and
    an impeller, being disposed at the second side of the housing to be coupled to an end of a transmission shaft of the rotor component;
    wherein an outer race of the transmission shaft proximate to the power output mechanism is keyed for coupling to a coupler.

17. A high-speed rotor assembly for an overhung centrifugal compressor, coupled to a power output mechanism, comprising:
    a housing, consisting of a first side, a second side, and having a plurality of circular ribs arranged therein, wherein the power output mechanism is disposed at the first side;
    a rotor component, arranged inside the housing;
    an oil film damper, arranged at a position between an end of a sleeve of the rotor component and one of the circular rib; and
    an impeller, being disposed at the second side of the housing to be coupled to an end of a transmission shaft of the rotor component;
    wherein a resilient element is a coil spring.

* * * * *